UNITED STATES PATENT OFFICE.

FRIEDRICH KRECKE AND IGNAZ ROSENBERG, OF BIEBRICH, GERMANY, ASSIGNORS TO KALLE & CO., OF SAME PLACE.

AZO DYE.

SPECIFICATION forming part of Letters Patent No. 563,383, dated July 7, 1896.

Application filed December 30, 1895. Serial No. 573,813. (Specimens.) Patented in England January 9, 1894, No. 515.

*To all whom it may concern:*

Be it known that we, FRIEDRICH KRECKE and IGNAZ ROSENBERG, doctors of philosophy, residing at Biebrich-on-the-Rhine, Germany, have invented new and useful Improvements in the Manufacture of Azo Dyestuffs, (for which we have obtained Letters Patent in England, No. 515, dated January 9, 1894,) of which the following is a specification.

This invention relates to the manufacture of a new class of azo dyestuffs prepared by combining 1.8.4.6. amidonaphtholdisulfo-acid called "K" acid with a molecular proportion of a diazo body. We made application for said K acid on the 30th day of December, 1895, Serial No. 573,812.

In order to carry out our invention, we proceed, for instance, as follows: 9.3 kilos of anilin dissolved in one hundred liters of water and twenty-four kilos of muriatic acid are diazotized in the cold by addition of seven kilos of sodium nitrite in aqueous solution. The product of this reaction is mixed with a cold solution of thirty-four kilos acid sodium salt of 1.8.4.6. amidonaphtholdisulfo-acid and twelve kilos of soda-ash in one thousand liters of water. The so-formed color is salted out, pressed, and dried. It forms a crystalline bronzy powder easily soluble in water, almost insoluble in alcohol, and dyes a bright red of great intensity on wool from an acid-bath.

Instead of the anilin used in the example other aromatic amins as well as amido azo bodies can be employed in corresponding quantity. We obtain in this manner a series of dyestuffs ranging in shade between red and dark blue. The combination of K acid, for instance, with diazo azo benzene dyes a reddish violet on wool.

What we claim is—

1. As a new method of manufacturing the preparation of a new class of azo dyestuffs by combining the 1.8.4.6. amidonaphtholdisulfo-acid with a molecular proportion of a diazo body.

2. As a new method of manufacture, the preparation of a new class of azo dyestuffs by combining the 1.8.4.6. amidonaphtholdisulfo-acid with the molecular proportion of a diazo azo body, substantially as described.

3. As a new substance the azo color which may be made by combination of 1.8.4.6. amidonaphtholdisulfo-acid with diazo benzene which forms a crystalline bronzy powder easily soluble in water almost insoluble in alcohol, and dyes a bright red of great intensity on wool from an acid-bath.

In testimony whereof we have signed our names to this specification in the presence of two subscribing witnesses.

FRIEDRICH KRECKE.
IGNAZ ROSENBERG.

Witnesses:
ROBERT DORFELDER,
CARL ED. HAHN.